Dec. 22, 1936.  L. DA C. CARVALHO  2,065,211
INFUSION MAKING APPARATUS
Filed April 5, 1934
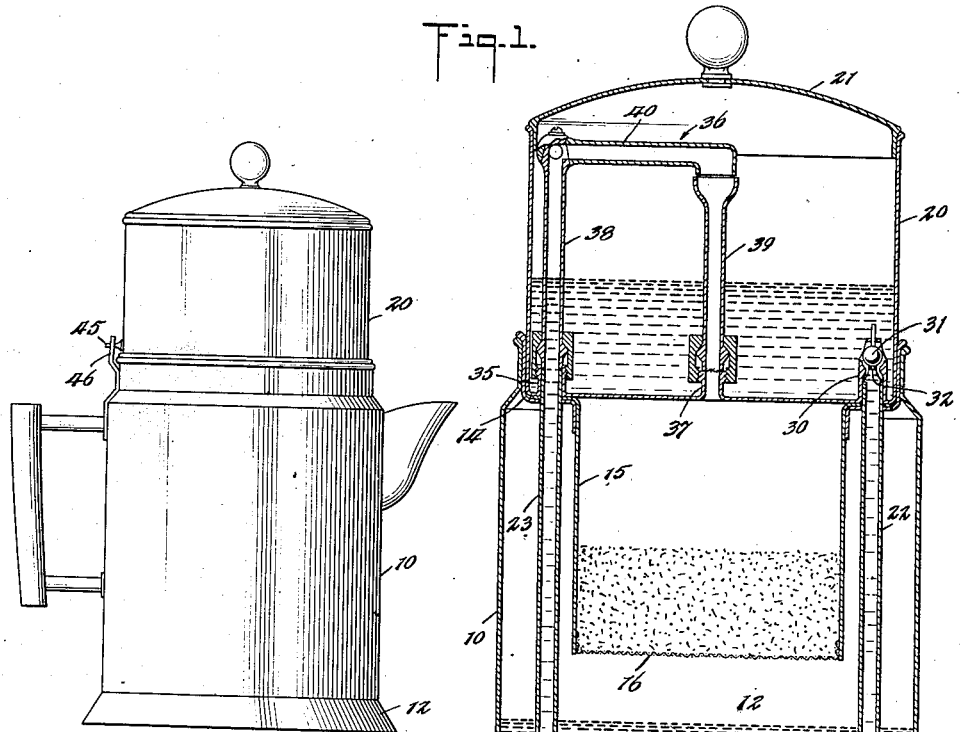
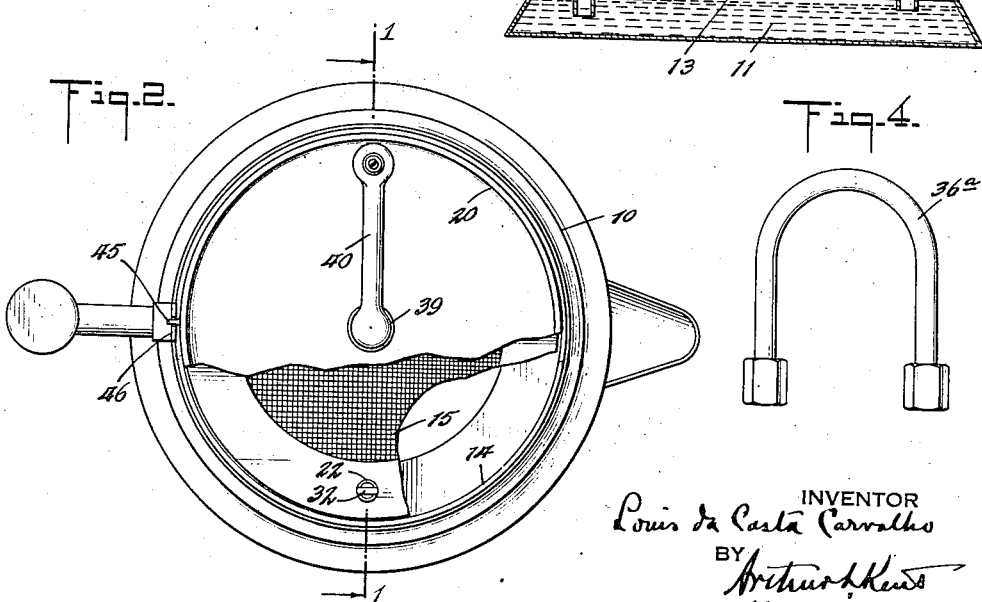
INVENTOR
Louis da Costa Carvalho
BY
his ATTORNEY Patented Dec. 22, 1936

2,065,211

UNITED STATES PATENT OFFICE 2,065,211

INFUSION MAKING APPARATUS

Louis da Costa Carvalho, New Orleans, La.

Application April 5, 1934, Serial No. 719,063

4 Claims. (Cl. 53—3)

This invention relates to infusion-making apparatus. The invention has been made especially with the idea of providing an improved apparatus for making coffee although the apparatus is adapted for making infusions of tea and other substances.

It is well known that coffee should desirably not be boiled after it has been made, since in boiling essential oils and other volatile ingredients of the coffee extract are expelled with the steam. On the other hand, to obtain maximum efficiency of extraction the water in contact with the coffee should be as near boiling temperature as possible and should pass through the coffee very slowly.

The object of the present invention is to provide an infusion-making apparatus which fulfills these conditions and is convenient to use, easy to clean and of comparatively inexpensive construction.

To these ends, an apparatus embodying the features of the invention in the preferred form comprises a main container, or pot, for the infusion, an upper container or basket for the ground coffee or other material from which the infusion is to be made, a shallow heating chamber directly beneath the main container or formed in the bottom thereof, a water reservoir removably mounted at the top of the main container, and means whereby water from the reservoir is caused to pass in successive small amounts at suitably spaced intervals into the heating chamber, and, when the water in the heating chamber has been heated to the boiling point after each filling of the chamber from the reservoir, a corresponding small amount of the boiling hot water is forced by the pressure of the steam from the heating chamber and discharged on to the ground coffee or other material in the upper container. The water passes through the coffee in the usual way and falls into the main coffee container. The whole operation is automatic, the intermittent discharge of hot water from the heating chamber and the refilling of the chamber with cold water from the reservoir being controlled by the pressure in the heating chamber, and the time required to bring successive small amounts of water up to the boiling point being utilized to space the successive discharges of small amounts of hot water on to the material in the upper container. The heating chamber serves also to keep the infusion in the main container or pot hot.

A full understanding of the invention can best be given by a detailed description of a coffee pot embodying the various features of the invention in the form I now consider best, and such a description will now be given in connection with the accompanying drawing illustrating such a coffee pot, and in which:

Fig. 1 is a central vertical section through the coffee pot;

Fig. 2 is a plan view of the same with the cover removed and parts broken away;

Fig. 3 is a side elevation, on a reduced scale, of the coffee pot; and

Fig. 4 is an elevation of a modified form of a connecting conduit.

The coffee pot comprises a main container, or pot, 10 open at the top and having at the bottom thereof a shallow heating chamber 11 separated from the main chamber 12 of the container by a partition plate or false bottom 13. Secured in the open top of the container 10 is a ring 14 having an outwardly extending flange to extend over the top edge of the container wall and an inwardly extending flange to serve as a seat for an outwardly extending flange at the top of an open-topped container, or basket, 15 for holding the ground coffee. The bottom of this ground coffee container is perforated to permit the infusion to escape from the container and drip into the chamber 12. The bottom 16 of the container 15 may be a perforated metal plate or may be formed of woven wire or otherwise formed to retain the ground coffee and permit passage of the liquid. Another container 20, which serves as the cold water reservoir, is removably mounted above the ground coffee container 15 by being seated within the ring 14 on its inwardly extending flange. This reservoir 20 has a removable cover 21 which may be used as a cover for the main container 10 when the reservoir is removed.

Extending upwardly from the water heating chamber 11 through the chamber 12 are two tubes 22 and 23 which serve, one for the passage of cold water from the reservoir 20 into the heating chamber, and the other for the passage of hot water from the heating chamber to be discharged into the container 15. The upper ends of these tubes pass through and are held in place by the inwardly extending flange of the ring 14 and project slightly above the flange. The cold water supply tube 22 is provided with a non-return valve 24 which permits water to flow downwardly but prevents it from flowing upwardly through the tube. The lower end of the hot water discharge tube 23 extends down into the water heating chamber so that the open end of the tube is at a suitable distance below the top of the chamber for the purpose hereinafter explained.

The bottom of the cold water container or reservoir 20 has three openings therein; a central opening to which the hot water discharge tube connects, and two openings near the sides of the container for receiving the ends of the tubes 22 and 23 when the reservoir is seated within the ring 14 in operative position. A short pipe or nipple 30 extends upward from the margin of the opening in the bottom of the reservoir 20 which receives the end of the tube 22, and this short pipe has a slightly conical bore so as to make watertight connection with the end of the tube 22 when the reservoir is moved down into position. The end of the tube 22 is also desirably made slightly conical. A valve is provided to prevent passage of water through the pipe 30 when the reservoir is not seated in operative position. This valve as shown comprises a ball 31 which, when the reservoir is positioned as shown, is lifted off its seat at the end of the pipe 30 by a bridge 32 across the upper end of the pipe 22.

The opening in the bottom of the reservoir which receives the end of the tube 23 is also provided with a short upwardly extending pipe or nipple 35 having a slightly conical bore to make watertight connection with the upper end of the tube 23, the upper end of the tube also desirably being slightly conical.

The nipple 35 is connected by an inverted U-shaped conduit 36 to a nipple 37 extending upwardly within the reservoir through the central opening through which the hot water is discharged on to the ground coffee in the container 15. This connecting conduit 36 as shown in Figs. 1 and 2 comprises a pipe 38 extending upwardly from the nipple 35, a pipe 39 extending upwardly from the nipple 37, and a horizontal connecting pipe 40 which is pivotally mounted on the upper end of the pipe 38 so that it may be turned to discharge either into the pipe 39 or into the reservoir. The pipes 38 and 39 are desirably detachably connected to the nipples 35 and 37 by means of screw coupling devices as shown. A connecting conduit which has no provision for discharging the hot water back into the reservoir 20 may, however, be used. Such a conduit 36a, consisting of a single piece of pipe bent to U-shape, is shown in Fig. 4. With this conduit hot water forced upward through the tube 23 will always be discharged into the ground coffee container. In all cases, the connecting conduit should extend above the maximum water level in the reservoir so that water cannot flow by gravity from the reservoir down through the tube 22 to the water heating chamber 11 and thence up through the tube 23 and connecting conduit 36 to the container 15.

In the use of the coffee pot, the ground coffee is placed in the container 15, as is customary in the use of drip coffee pots. A suitable amount of water, preferably cold water, is put into the reservoir 20, and the reservoir, either before or after the water is put therein, is placed in position with the upper ends of the tubes 22 and 23 extending into the pipe 30 and the nipple 35 respectively. Water from the reservoir will then flow down through the tube 22 into the water heating chamber 11 and will fill the chamber excepting for the space occupied by air pocketed therein.

The pot is then set over a suitable heating flame or other heating means whereby the water in the chamber 11 will be heated. When the water in the chamber 11 boils, the pressure of the steam will cause water to be expelled from the chamber through the discharge tube 23. Upflow of water through the supply tube 22 will be prevented by the non-return valve 24. The boiling hot water forced up through the tube 23 will be discharged through the connecting conduit 36 on to the ground coffee in the container 15. The upward flow of water through the tube 23 will continue until the water level in the chamber 11 drops below the bottom of the tube, whereupon the steam will pass up through the tube 23 and the upflow through the tube 23 will cease and the pressure in the chamber 11 will drop and some cold water will be permitted to flow into the chamber from the tube 22. By this entering cold water the steam in the chamber 11 will be condensed and the water will then continue to flow into the chamber until the chamber is again filled. When the water in the chamber 11 is again heated to the boiling point, there will be a further discharge of hot water through the tube 23 and connecting conduit 36 into the container 15 until the water level in the chamber 11 again drops below the end of the tube 23. The chamber 11 will then again be refilled and the operation will continue, successive small amounts of hot water being discharged on to the ground coffee in the container 15 at spaced intervals.

The length of the intervals between successive discharges of hot water from the heating chamber 11 to the container 15 will depend on the size of the chamber 11 and the depth to which the end of the tube 23 extends down into the chamber; and also, of course, on the amount of heat applied to the bottom of the chamber. The extent to which the end of the tube 23 projects down into the chamber 11, that is, the distance from the top of the chamber to the open end of the tube, determines the amount of water there will be in the chamber above the level of the end of the tube when the chamber has been filled, and therefore, the amount which will be discharged on to the ground coffee at each expulsion of water from the chamber. The length of the interval between successive expulsions of water from the heating chamber 11 with a given rate of application of heat to the chamber will depend on the amount and temperature of the water entering the chamber after each expulsion and the amount of hot water remaining in the chamber after each expulsion. The larger the amount of water entering the heating chamber and the colder it is, the longer the interval, and the larger the amount of hot water remaining in the heating chamber, the shorter the interval.

The discharge of successive small amounts of water at intervals into the ground coffee container will continue so long as the necessary heat is applied and there is water remaining in the reservoir above the inlet opening at the top of the pipe 30. Thereafter the coffee pot may be left over the source of heat and the infusion in the container 10 will be kept hot by heat from the chamber 11 without danger of the infusion being boiled. If it is desired to stop further discharge of hot water into the container 15 before the level of water in the reservoir is down to the top of the pipe 30, the arm 40 is turned so that it will discharge into the reservoir instead of into the pipe 39. Thereafter, circulation of water between the reservoir and the heating chamber will continue, and a highly efficient heating of the coffee pot and its contents will result.

To aid in positioning the cold water reservoir 20, a suitable positioning device on the outside of the apparatus is desirably provided, such as the pin 45 on the reservoir and the slotted plate 46 extending upward from the top of the container 10.

What is claimed is:

1. Apparatus for making drip coffee, comprising in combination with a pot having an upper container for ground coffee formed and positioned to permit liquid to pass therefrom into the pot, a water heating chamber at the bottom of the pot, a supply tube extending downward from near the top of the pot for supplying cold water to the heating chamber, a non-return valve for preventing reverse flow through said tube, a discharge tube extending upward from the heating chamber to near the top of the pot, the lower end of the discharge tube opening into the heating chamber at a point intermediate the top and bottom thereof, a removable water reservoir adapted to seat at the top of the pot above the ground coffee container, said reservoir having openings in its bottom to register with the ends of the supply and discharge tubes when the reservoir is positioned on the pot, means for making watertight connections between the tubes and the bottom of the reservoir, the reservoir also having a central opening in the bottom thereof, and means providing a connecting conduit within the reservoir extending upward from the opening which registers with the end of the discharge tube to a point above the maximum water level in the reservoir and thence downward to said central opening.

2. Apparatus as claimed in claim 1, having a valve at the opening in the bottom of the reservoir which registers with the supply tube for preventing escape of water from the reservoir when it is not positioned on the pot, and means for holding said valve open when the reservoir is positioned on the pot.

3. An infusion-making apparatus, comprising a main container open at the top and having a false bottom forming a water-heating chamber in the bottom of the container, the space above the false bottom constituting an infusion-receiving chamber, an upper container for the substance from which the infusion is to be made detachably supported within the upper part of said main container and formed to permit liquid to pass therefrom into the infusion-receiving chamber, a water reservoir adapted to seat detachably on said main container above said upper container, two tubes within said main container extending upwardly from the false bottom, said reservoir having a water discharge orifice adapted to make water-tight engagement with the upper end of one of said tubes, a non-return valve for preventing reverse flow through said last mentioned tube, said reservoir also having an inverted U-shaped conduit one arm of which is adapted to make water-tight engagement with the upper end of the other of said tubes and the other arm of which is adapted to discharge the hot water into said basket, the last mentioned tube opening into the heating chamber at a point intermediate the top and bottom thereof, and the U-shaped conduit extending above the level of the water in the reservoir to prevent gravity flow from the reservoir to said upper container.

4. An infusion-making apparatus as in claim 3, in which the water discharge orifice of the reservoir is provided with a valve for preventing escape of water when the reservoir is not seated, and means is provided for holding said valve open when the reservoir is seated on the main container.

LOUIS DA COSTA CARVALHO.